Patented June 30, 1931

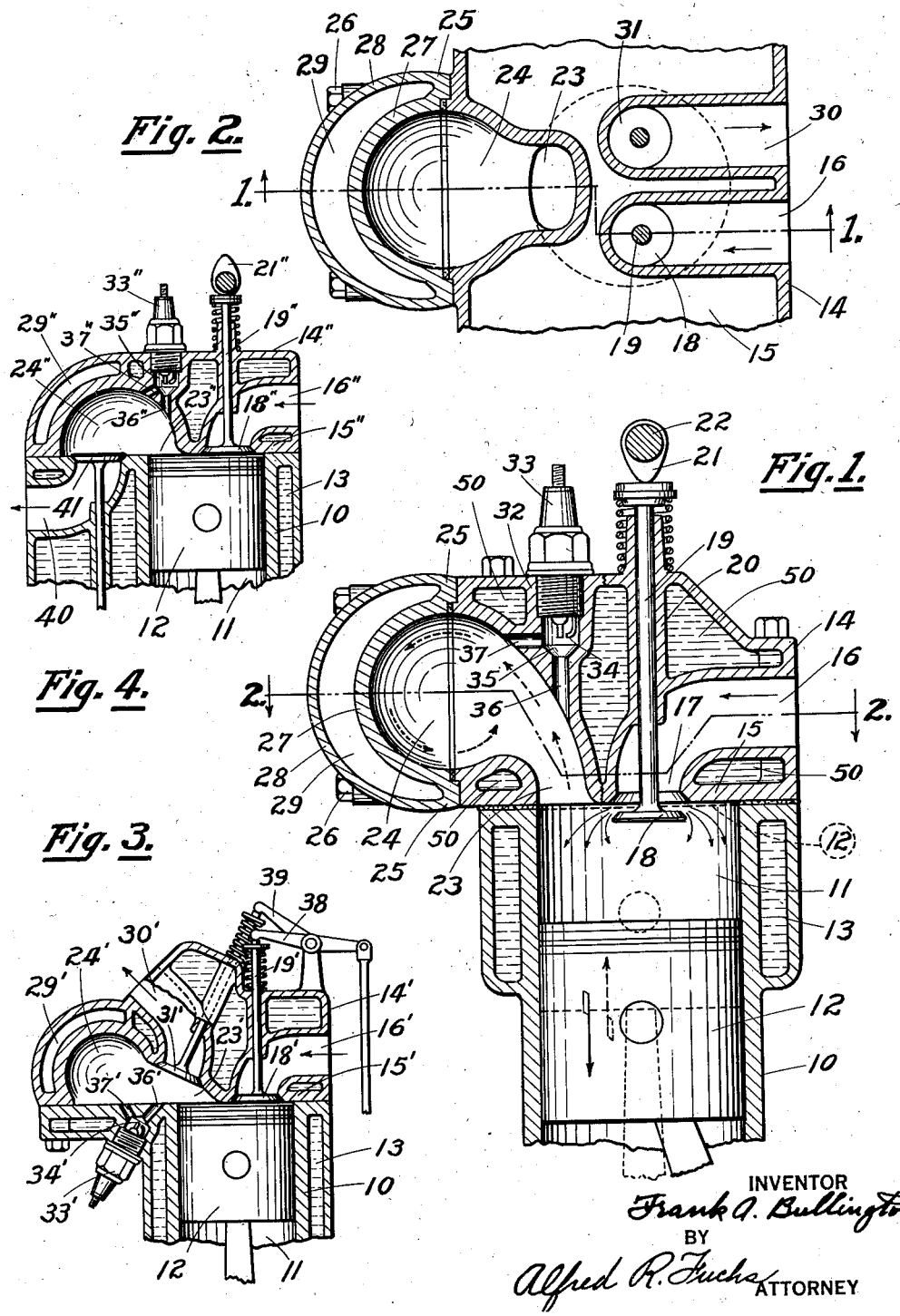

1,812,197

UNITED STATES PATENT OFFICE

FRANK A. BULLINGTON, OF KANSAS CITY, MISSOURI, ASSIGNOR TO BULLINGTON ENGINE HEADS, OF KANSAS CITY, MISSOURI, A COMMON-LAW TRUST CONSISTING OF LOUIS R. ASH, HOWARD P. TREADWAY, AND FRANK A. BULLINGTON

ISOTHERMAL FUEL INLET MEANS FOR INTERNAL COMBUSTION ENGINES

Application filed February 12, 1927. Serial No. 167,755.

My invention relates to internal combustion engines, and more particularly to isothermal working fluid or fuel inlet means for internal combustion engines, of the four-cycle type.

It is a purpose of my invention to provide means for supplying working fluid or fuel mixture to an engine cylinder with a minimum rise in temperature of the working fluid admitted during the period of intake action. This is of very great advantage in increasing the efficiency of the engine, in view of the fact that ordinarily, in internal combustion engines as now commonly known in the art, the fresh fluid charge is introduced into the cylinder through the combustion chamber space, where it mingles with the residual burned gas therein, being thereby heated to such an extent that it is greatly expanded in volume. As the temperature of the burned gas in the combustion chamber is always relatively high, and particularly so when the engine is operated at or near its full power capacity, the rise in temperature of the working fluid thus introduced is relatively great, and causes a large percentage increase in volume of the working fluid or fuel mixture. This causes the fluid filling the space within the cylinder to become less concentrated than would be the case if the same had not been raised in temperature, thus causing the introduction of a smaller amount of fluid into the cylinder than would be the case if the same had not been heated. This is partly offset by the increase in the combined capacity of the cylinder and combustion chamber due to the cooling effect of the fresh fluid charge being mingled therewith. The net loss of capacity for incoming fluid of the cylinder due to the heating of the fresh fluid charge by residual gas heat is, however, still a large percentage of the volumetric displacement of the piston, and this loss is reduced to a minimum by my isothermal means for introducing working fluid into the cylinder.

It is a further purpose of my invention to provide means for introducing the fresh working fluid into the engine cylinder in such a manner that the incoming fresh fluid and the residual burned gas are kept separate during the period of intake in order to be mingled during the period of compression action. By providing substantially a complete separation of the incoming fresh fluid from the residual burned gas during the intake stroke of the engine, an isothermal fluid inlet means is provided, that provides the maximum intake efficiency for an internal combustion engine.

It is still a further object of my invention to provide for active mingling of the fresh working fluid or fuel mixture and the hot residual burned gas during the latter part of the compression stroke to reduce the work necessary for compression of the working fluid mixture, by utilizing said heat for increasing the compression pressure of the mixture due to heating action thereof on said fresh fluid particularly during the latter part of the compression stroke of the piston. In order to obtain the most thorough mingling of the fresh fluid and the hot residual burned gas, a main combustion chamber, separate from the cylinder chamber but communicating therewith, is provided, said combustion chamber and the communicating passage between the same and the cylinder chamber being so formed, that a condition of turbulence is set up in the combustion chamber as the fluid charge from the cylinder chamber is moved into the same, due to the action of the piston during the compression stroke thereof.

Another purpose of the invention is to reduce the heat radiation loss from the engine combustion chamber, this being preferably accomplished by providing a heat insulating air space in the surrounding wall portion of the combustion chamber. The means to accomplish this purpose also preferably constitutes means for absorbing the heat radiated from the combustion chamber wall during combustion and restoring the same to the combustion chamber wall during succeeding cooler periods within the combustion chamber. Furthermore, as very intimate contact between the working fluid entering the combustion chamber during the latter part of the compression stroke and said wall is obtained due to the condition of turbulence existing therein at that time, heat is transferred to the fluid from said wall.

It is also a purpose of my invention to provide ignition means associated with the passage providing communication between the cylinder chamber and the combustion chamber and also associated with the combustion chamber, said means preferably comprising multiple ignition means for simultaneously igniting the compressed fuel charge at a plurality of points.

In the forms of the invention shown in the drawings the working fluid inlet means comprises a valve opening directly into the cylinder chamber, said valve being mounted in the cylinder head, and in the preferred form the exhaust valve also opens directly into the cylinder chamber and is mounted in said head. Furthermore, the combustion chamber referred to above is provided in said cylinder head, and in the preferred form is made of a substantially spherical shape and is closed at all times except for the passage leading into the cylinder chamber. Preferably the cylinder head is so constructed that substantially all the compression space is within said head, only mechanical clearance being provided between said head and the piston, and said compression space constituting the combustion chamber and the communicating passage between the same and the cylinder chamber.

It is also an object of my invention to provide a detachable cylinder head of the character described adapted to be manufactured and applied to engines of the character described and now in common use, by substitution of my improved cylinder head for the cylinder head originally provided on such engines.

Other objects and advantages of the invention will appear as the description of the drawings proceeds. I desire to have it understood, however, that I do not intend to limit myself to the details of construction shown or described, but that I intend to include as part of my invention all such obvious changes and modifications as would occur to a person skilled in this art and as would fall within the scope of the claims.

In the drawings:

Fig. 1 is a fragmentary vertical sectional view of the upper portion of an engine cylinder and associated parts embodying my invention.

Fig. 2 is a fragmentary section taken on the line 2—2 of Fig. 1.

Fig. 3 is a view similar to Fig. 1, on a reduced scale, of a modification and

Fig. 4 is a view similar to Fig. 1, on a reduced scale, of a further modification.

Referring in detail to the drawings, in Figs. 1 and 2 my improved fuel inlet means is shown as being applied to an engine having a cylinder 10, having a chamber 11 therein, in which the piston 12 operates. The cylinder 10 is provided with a water jacket having the spaces 13 provided therein for the circulation of a cooling medium such as water. Mounted upon the cylinder is a cylinder head 14 having spaces 50 therein for cooling medium and a wall portion 15 adapted to comprise an end wall for the cylinder chamber 11.

The cylinder head member 14 is provided with an inlet passage 16 leading to the inlet port 17, with which the inlet valve member 18 cooperates in the usual manner, said inlet port opening directly into the cylinder chamber 11, as clearly shown in Fig. 1.

The valve member 18 is provided with a valve stem 19 slidably mounted in a guide in the wall portion 20 in said cylinder head 14, and is actuated in any desired manner, being shown in Figs. 1 and 2 as being actuated by means of a cam member 21 on the cam shaft 22.

The cylinder head member 14 is further provided with a curved passage 23 leading to combustion chamber 24 from the cylinder chamber 11, said combustion chamber 24 being preferably substantially spherical and said passage 23 being restricted relative to said combustion chamber and gradually increasing in cross sectional area toward said combustion chamber. Furthermore, said passage 23 enters the combustion chamber 24 substantially tangentially thereof, to thus set up a turbulence in the form of a whirling action therein as the working fluid passes through the passage 23 from the cylinder chamber 11 into the combustion chamber 24. The spherical combustion chamber is preferably partially formed within the main casting of the cylinder head 14 and partially within the detachable member 25 secured to the main casing of said head in any suitable manner, as by means of the securing devices 26, so as to facilitate the machining of said chamber 24.

The member 25 is preferably provided with a wall portion 27 and a wall portion 28 spaced therefrom to form a dead air space 29 therein, which is preferably closed to the outer air. The air space 29 being sealed, the increase of the temperature of the air therein during the combustion periods within the combustion chamber, will cause an increase in the pressure of said air, said pressure acting on the wall 27 to resist explosion pressure from within said combustion chamber. Said air space further serves to reduce the loss of heat from the combustion chamber due to radiation, and since the radiated heat is absorbed by the air in said space 29 the heat absorbed from a previous combustion of fuel mixture in the engine is transferred through the wall portion 27 to the working fluid within the combustion chamber, thus raising the temperature thereof and reducing the heat losses in the engine, which are a very big item in the thermal efficiency of the engine. This transfer of heat is aided due to the turbulence set up within the combustion chamber as the working fluid enters the same, causing the working fluid to come into intimate contact with the wall portion 27.

The cylinder head member 14 is further provided with an exhaust passage 30 communicating with the cylinder chamber 11 directly through a port controlled by the exhaust valve member 31. A spark plug receiving socket 32 is further provided in said cylinder head with which the spark plug 33 has screwthreaded connection, said spark plug 33 having terminals 34 located within the initial ignition chamber 35. From said ignition chamber 35 the ignition propagation passages 36 and 37 lead to the passage 23 and the combustion chamber 24, respectively.

In Fig. 1 the piston is shown in full lines as having begun its intake stroke, with the inlet valve 18 unseated, the arrows appearing in full in said figure, indicating the direction in which the fuel mixture passes into the cylinder chamber 11. The position of the piston in the cylinder as it completes the compression stroke is shown in dotted lines therein, adjacent the end wall 15 and the broken line arrows in said figure indicate the flow of the fuel mixture into the combustion chamber, showing the whirling action thereof.

When the piston commences its compression stroke the fuel mixture and the burned gas are separated, the fuel mixture being located in the cylinder chamber 11 between the piston head and the cylinder head wall, while the burned gas is located substantially entirely within the combustion chamber 24 and the passage 23. As the piston 12 moves toward the cylinder head during the compression stroke the fuel mixture is compressed and transferred into the combustion chamber. As a result the space within the combustion chamber 24 and passage 23 occupied by the burned residual gas is reduced and the fuel mixture first enters the passage 23 and finally the combustion chamber 24. The movement of the fuel mixture into said passage 23 and chamber 24 is at first relatively slow, due to the fact that the cylinder chamber has not been very greatly reduced in volume, but when the piston nears the end of its compression stroke, substantially all the fuel mixture within the cylinder chamber 11 is expelled therefrom through the passage 23 into the chamber 24, setting up a rapid flow thereof through said passage and setting up a violent turbulence within the chamber 24. Thus the fuel mixture is not brought into intimate contact with the hot residual burned gas in the combustion chamber until the latter part of the compression stroke and is not appreciably heated thereby until near the end of the compression stroke. As said fuel mixture is brought into intimate contact with the hot residual gas, a transfer of heat to the fuel mixture takes place, causing greatly increased pressure in said fuel mixture, due to the tendency of the heat to expand the same.

Due to the arrangement of the fluid inlet port and the isolation of the fluid inlet means from the combustion chamber a substantially isothermal fluid inlet arrangement relative to the hot residual gas is provided. Furthermore, due to the separated arrangement of the fuel charge and burned gas at the end of the intake stroke the fuel charge acts as a cooling medium for the piston head during the intake and compression strokes of the piston, and is heated by the hot residual gas in the combustion chamber only during the compression stroke of the piston, and only appreciably during the latter part of said compression stroke, as described above. Due to the fact that the fuel charge is not heated or expanded during the passage thereof into the cylinder chamber a greater amount of fuel is supplied thereto. Accordingly a combustion chamber larger than in the ordinary construction is provided when the fuel is to be compressed to the pressure normally used in engines of the general type shown, or higher compression pressure than normally used may be obtained without objectionable reduction of the combustion space volume.

The total amount of useful work necessarily absorbed by the piston in compressing the fuel mixture is greatly reduced by my invention, as the fuel is confined under pressure when the hot residual burned gas mingles therewith, and the heat then applied results in an increase in pressure within said fuel mixture. The mean effective pressure of the piston compression stroke is thereby reduced, and the engine thereby made more powerful and efficient in proportion to such reduction.

By the arrangement of the ignition propagation passages 36 and 37 the fuel mixture is not only ignited within the combustion chamber 24 but also in the passage 23, thus avoiding the entrance of unburned fuel mixture into the cylinder chamber from said passage prior to the entrance of the burning gas into the same.

In Fig. 3 a modification of the invention is shown, in which the inlet valve, only, opens directly into the cylinder chamber, the exhaust valve being associated with the passage leading into the combustion chamber from the cylinder chamber. In said figure the piston, cylinder, and cylinder chamber are indicated by the same numerals as in Figs. 1 and 2 as the construction thereof is substantially the same. The intake passage 16' leads directly through the cylinder head 14' into the chamber 11, a valve 18' being provided at the entrance thereof into said chamber 11. The valve 18' is provided with a stem 19' and is actuated by means of the rocker arm 38 in a well known manner. The passage 23' leads to the combustion chamber 24', which is partially spherical and which is provided with a dead air space 29', for the same purpose as the space 29, in the form shown in Figs. 1 and 2. The spark plug 33' is carried by the cylinder block instead of by the cylinder head in this form, and has the ignition propagation passages 36' and 37' leading from the ignition chamber 34' respectively to the passage 23' and the chamber 24'. The exhaust passage 30', however, leads from the passage 23' instead of directly from the cylinder chamber 11 and the valve 31' controlling the exhaust through said passage is actuated by a rocker arm 39 in the usual manner. The advantage of this arrangement is, that the valves 18' and 31' can be made larger, if desired, than in the form shown in Figs. 1 and 2, while the operation of the engine is very similar to that described in connection with Figs. 1 and 2.

The modification shown in Fig. 4 also makes it possible to make the valves larger, if desired, this form of the invention being somewhat similar to what is known as an F-head engine, but applying the same principles thereto as are applied to the valve-in-head form shown in Figs. 1 and 2. In said figure, the cylinder, cylinder chamber and piston are the same as previously described and are indicated by the same reference numerals. The cylinder head 14″ in this form is provided with an inlet passage 16″ corresponding to the passage 16 in Fig. 1 which opens directly into the cylinder chamber 11, being provided with an inlet valve 18″ actuated by the cam 21″. The spark plug 33″ is mounted in substantially the same position as the spark plug 33 in Fig. 1, and the fuel propagation passages 36″ and 37″ lead from the ignition chamber 35″ to the passage 23″ and the combustion chamber 24″ in substantially the manner described in connection with the corresponding parts in Figs. 1 and 2. In this form of the invention, however, the exhaust passage 40 is located in the engine cylinder block and the exhaust valve 41 controls the opening leading from the combustion chamber 24″ into the said exhaust passage.

While there are certain advantages to each of these forms, the principal advantages of the invention are present in all of the same, and turbulence is set up in all the combustion chambers as the fuel mixture enters the same near the end of the compression stroke of the piston.

Having thus described my invention, what I desire to claim and secure by United States Letters Patent is:

1. In an internal combustion engine, a cylinder chamber, a combustion chamber communicating therewith and a closed air chamber contacting a portion of the wall surface of said combustion chamber.

2. In an internal combustion engine, a cylinder chamber, a combustion chamber communicating therewith and being otherwise permanently closed and means separate from and having no connection with said combustion chamber for absorbing heat from the burning gases in said combustion chamber and subsequently returning said heat to compressed working fluid mixture in said chamber.

3. In an internal combustion engine, a cylinder chamber, a combustion chamber spaced therefrom, a passage between said chambers opening into said cylinder chamber at one side thereof and into said combustion chamber eccentrically thereof, said combustion chamber being otherwise permanently closed and fluid inlet means for said cylinder chamber.

4. In an internal combustion engine, a cylinder, a cylinder head, a piston operating in said cylinder adapted to closely approach said head, having substantially only mechanical clearance therefrom, a combustion chamber spaced from and communicating with said cylinder and being otherwise permanently closed, ignition means associated with said combustion chamber, and fuel inlet means to said cylinder distinct from said combustion chamber, said combustion chamber receiving its fuel charge solely from said cylinder.

5. In an internal combustion engine, a cylinder, a cylinder head, a piston operating in said cylinder adapted to closely approach said head, having substantially only mechanical clearance therefrom, a combustion chamber in said head communicating with said cylinder and spaced therefrom and valved fuel inlet means in said head leading directly into said cylinder in spaced relation to said combustion chamber, said combustion chamber receiving its fuel charge solely from said cylinder.

6. In a four-cycle internal combustion engine, a cylinder chamber, a cylinder head, a piston operating in said chamber and having only mechanical clearance from said head, a combustion chamber spaced from the cylinder chamber adapted to receive substantially the entire contents of said cylinder chamber during the compression stroke of said piston, and having a restricted passage communicating with said cylinder chamber, and being otherwise permanently sealed.

7. A detachable cylinder head having an inlet valve therein and having a combustion chamber adapted to contain substantially the entire fuel charge for the engine cylinder with which said head is associated, said chamber being formed to provide a restricted passage opening into the cylinder, and ignition means associated with said passage, said cylinder head being provided with an ignition pocket and said ignition means comprising a spark plug located in said pocket, said pocket having an outlet opening into said restricted passage.

8. A detachable cylinder head having an inlet valve therein and having a combustion chamber adapted to contain substantially the entire fuel charge for the engine cylinder with which said head is associated, said chamber being formed to provide a restricted passage opening into the cylinder, and ignition means, comprising a spark plug, associated with said passage, said cylinder head having an ignition passage leading from the spark plug and directed toward said restricted passage and toward the cylinder to which the head is applied.

9. A detachable cylinder head having an inlet valve therein and having a combustion chamber adapted to contain substantially the entire fuel charge for the engine cylinder with which said head is associated, said chamber comprising a main portion and a restricted passage opening into the cylinder, and ignition means associated with said passage, said cylinder head being provided with an ignition pocket and said ignition means comprising a spark plug located in said pocket, said pocket having an outlet having an opening directed toward said restricted passage and an outlet having an opening directed toward the main portion of said combustion chamber.

10. A detachable cylinder head having an inlet valve therein and having a combustion chamber adapted to contain substantially the entire fuel charge for the engine cylinder with which said head is associated, said chamber being provided with a restricted passage opening into the cylinder, and ignition means comprising a spark plug associated with said passage, said combustion chamber wall being otherwise closed.

11. In an internal combustion engine, a cylinder chamber and a combustion chamber communicating therewith, said combustion chamber being provided with a detachable double walled portion to provide a jacket portion forming a dead air space.

12. In an internal combustion engine, a cylinder head having a combustion chamber therein and a detachable closed jacket portion on said head having spaced walls providing a sealed dead air chamber adjacent a portion of said combustion chamber.

13. A detachable cylinder head having a combustion chamber therein comprising a pocket and a passage communicating with the engine cylinder with which said cylinder head is associated, said passage opening into said cylinder at one side thereof, said pocket being in communication with said cylinder through said passage and being otherwise closed and ignition means in said cylinder head overlying and aligning with said passage and adjacent said pocket.

14. In an engine of the character described, a cylinder, a piston operating therein, a cylinder head having a restricting wall portion overlying the cylinder from which said piston has only mechanical clearance at the end of its compression stroke, a pocket in said cylinder head open toward said cylinder inlet means in said cylinder head spaced from said pocket, said cylinder head being formed so as to provide a passage for communication between said pocket and cylinder, and ignition means in said cylinder head adjacent said pocket and passage.

15. In an engine of the character described, a cylinder, a piston operating therein, a cylinder head having a restricting wall portion overlying the cylinder from which said piston has only mechanical clearance at the end of its compression stroke, a combustion chamber in said head comprising a pocket having an opening toward the cylinder but being otherwise closed inlet means in said cylinder head spaced from said pocket, and ignition means in said cylinder head adjacent the opening to said pocket.

16. In an engine of the character described, a cylinder, a piston operating therein, a cylinder head having a restricting wall portion overlying the cylinder from which said piston has only mechanical clearance at the end of its compression stroke, a combustion chamber in said head comprising a pocket having an opening into the cylinder head, but being otherwise closed, inlet means in said cylinder head spaced from said pocket, and ignition means in said cylinder head between said pocket and said inlet means and adjacent the opening to said pocket.

In testimony whereof, I hereunto subscribe my name this 10th day of February, 1927.

FRANK A. BULLINGTON.